Sept. 23, 1941.   R. E. STEELE   2,256,631
RECAPPING PROCESS
Filed May 27, 1940

INVENTOR.
Robert E. Steele
BY Carlos G. Stratton
ATTORNEY

Patented Sept. 23, 1941

2,256,631

UNITED STATES PATENT OFFICE 2,256,631

RECAPPING PROCESS

Robert E. Steele, Pomona, Calif.

Application May 27, 1940, Serial No. 337,354

1 Claim. (Cl. 154—14)

My invention relates to a process of recapping worn automobile tires. An object of the invention is to provide means to restore the tire substantially to its original contour by using the kettle cure process.

It is also an object of the invention to restore the tire to its original shape without use of a mold, which changes the contour of the tire during the molding process.

Since the kettle cure process does not change the shape of a tire, it is necessary to provide means for recapping tires that are the shape that will be desired when the kettle cure process is completed. It is an object of the invention to carry out this objective.

The invention also comprises novel details of construction and novel combinations and arrangements of parts, which will more fully appear in the course of the following description. However, the drawing merely shows and the following description merely describes an embodiment of the present invention, which is given by way of illustration or example only.

In the drawing, like reference characters designate similar parts in the several views.

Figure 1:
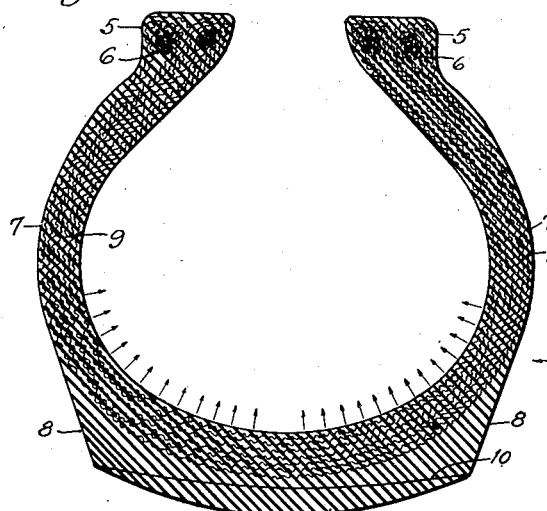
Figure 1 is a cross-section of a tire, embodying the present invention.
Figure 4:
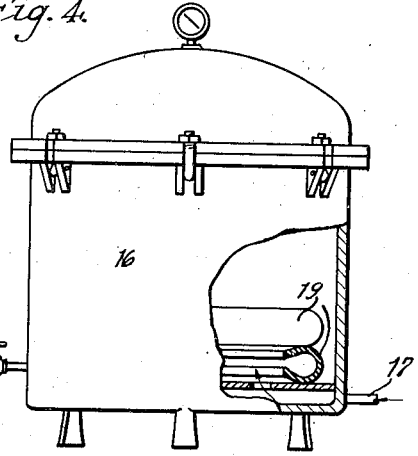
Figure 4 is a view showing the tire of the present invention being cured by the kettle cure process.

Referring more in detail to the drawing, the rim of a pneumatic tire is shown at 5 with conventional cables embedded therein at 6. Side walls 7 extend between the rims and shoulders 8. Layers of fabric 9 are embedded in the rubber of the tire.

The contour of Figure 1 illustrates the contour of a new tire. The line 10 shows the approximate shape of the tread of the tire after it has become worn. When the tire is substantially new and is of the shape shown in Figure 1, the pressure upon the tire is resiliently distributed as shown by the arrows in Figure 1. It will be noted that the pressure is substantially equally divided around the lower half of the tire, with the exception of a relatively small space at the lower center of Figure 1.

Figure 2:
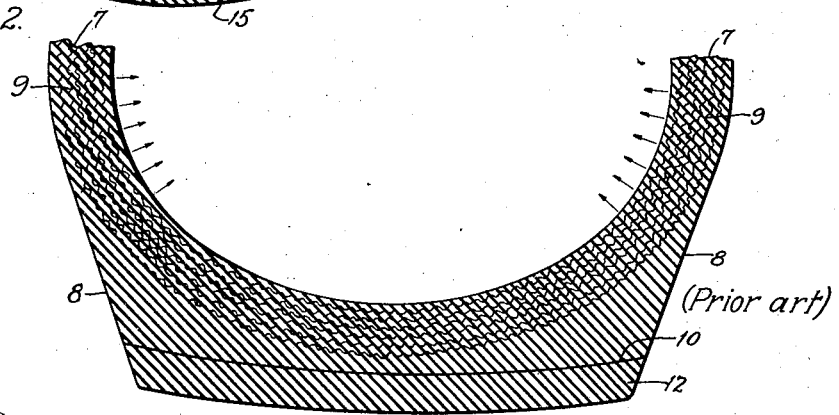
Figure 2 is a broken cross-section of shoulders and tread of a tire of the prior art.

However, when the tire becomes worn, the pressure is largely borne by the side walls 9, as shown by the arrows in Figure 2. In other words, the flexing of a new tire under working conditions is substantially equal around the arc of arrows of Figure 1, and when the tire becomes worn until it is near the fabric, the flexing is borne by the side walls, as shown by the arrows in Figure 2.

The recap 12 shown in the drawing illustrates a conventional recap for a tire. With such a recap having the same thickness substantially from edge to edge, there would be no change in the distribution of the pressure between a worn out tire and such a recapped tire. In other words, this recap would not restore the contour of the tire to its original shape and would not restore the distribution of pressure shown by the arrows in Figure 1.

Figure 3:
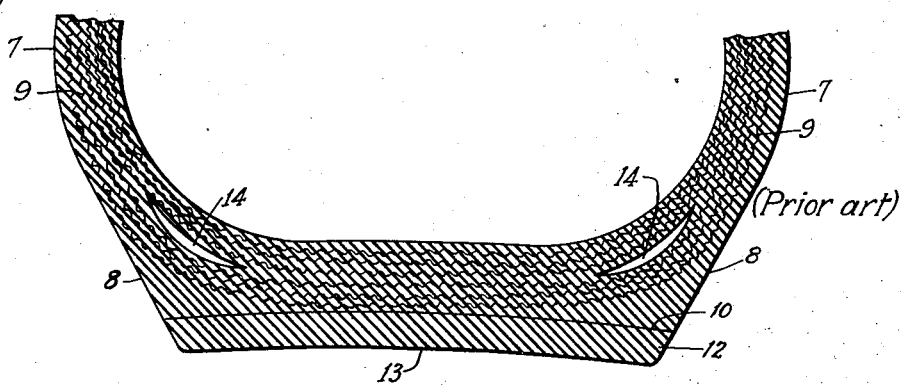
Figure 3 is a broken cross-section similar to Figure 2, but showing how tires wear when recapped by the kettle cure process heretofore used.

When a tire is recapped by a recap such as shown at 12, it merely thickens the tread. The result is that the greatest pressure must be borne by the shoulders 8. In fact, in actual practice the center of the tread bulges upwardly, as shown at 13. Since the shoulders bear the pressure, continued use tends to break down the shoulders, as shown by the splits 14 in Figure 3. When the layers of fabric thus tear apart, the likelihood of blowouts is materially increased.

In the present invention, to restore the tire to its original shape, the surface 10 is buffed off and a rubber adhesive applied thereto. Then a recap whose greatest thickness is at the center and which gradually tapers off toward the edges, is applied to the adhesive tread surface 10. The inner surface of the recap 15 is likewise very tacky. Pressure by rollers is then applied to the recap 15 to cause it to firmly adhere to the tread.

The tire recapped by the new recap 15 is then placed in a kettle 16 and steam pressure applied thereto, the steam entering the kettle by pipe 17 and leaving by pipe 18. When the tires 19 in the kettle are removed from the kettle they are the same shape as when placed therein. Suitable tread design may then be cut in the new tread 15 of the tire.

By restoring the tire to its original shape, the weight of the vehicle is not thrown on to the shoulders, but is largely borne by the center of the tread.

Another objection to a recap of the shape of that shown at 12 in the drawing is that the tendency is for it to loosen at its edges because of the extra wear and weight put on the shoulders 8.

Less heat is generated by restoring the tire to its original contact, since a smaller surface is in contact with the road. Moreover, distortion of tires by molds is avoided by the kettle cure process that is used to aid in carrying out the present invention.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claim.

Having thus described my invention, what I claim and desire to secure by Letters Patent is:

The process of repairing tires, by the use of the kettle cure process, comprising buffing off the tread of a tire that is thinner at the center of the tread than at the edges thereof, to produce corners between the buffed surface and the surfaces of the side walls, applying to the buffed tread a lamination of rubber having its greatest thickness at its center portion and tapering from the center portion to its edges, the edges of the lamination being placed to coincide with the corners formed by the intersection of the side wall surfaces with the buffed portion, and vulcanizing the tire lamination by steam pressure, preserving substantially the same contour of the tire during vulcanization.

ROBERT E. STEELE